(12) United States Patent
Shah (10) Patent No.: US 10,175,763 B2
(45) Date of Patent: Jan. 8, 2019

(54) DEVICE AND METHOD FOR CONTROLLING HAPTIC SIGNALS

(71) Applicant: Immersion Corporation, San Jose, CA (US)

(72) Inventor: Kaniyalal Shah, Fremont, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/790,426

(22) Filed: Oct. 23, 2017

(65) Prior Publication Data

US 2018/0046251 A1 Feb. 15, 2018

Related U.S. Application Data (63) Continuation of application No. 14/950,797, filed on Nov. 24, 2015.

(60) Provisional application No. 62/087,752, filed on Dec. 4, 2014.

(51) Int. Cl.
*G06F 3/01* (2006.01)
*A63F 13/24* (2014.01)
*A63F 13/285* (2014.01)

(52) U.S. Cl.
CPC ............. *G06F 3/016* (2013.01); *A63F 13/24* (2014.09); *A63F 13/285* (2014.09)

(58) Field of Classification Search
CPC .......... G06F 3/016; G06F 2203/013–2203/015
See application file for complete search history.

(56) References Cited

U.S. PATENT DOCUMENTS

| | | | |
|---|---|---|---|
| 6,342,880 B2 | 1/2002 | Rosenberg et al. | |
| 7,446,752 B2 | 11/2008 | Goldenberg et al. | |
| 7,545,367 B2 | 6/2009 | Sunda et al. | |
| 9,092,954 B2 * | 7/2015 | Visitacion | G08B 6/00 |
| 9,202,355 B2 | 12/2015 | Hill | |
| 9,261,963 B2 | 2/2016 | Jiang et al. | |

(Continued)

FOREIGN PATENT DOCUMENTS

EP 2772832 9/2014

OTHER PUBLICATIONS

Extended European Search Report, EP Application No. 15 197 035, dated Jun. 1, 2016.

(Continued)

*Primary Examiner* — Gene W Lee
(74) *Attorney, Agent, or Firm* — Medler, Ferro, Woodhouse & Mills PLLC (57) ABSTRACT

A non-transitory computer-readable medium for generating a haptic effect is provided. The computer-readable-medium has computer-executable code that causes a processor to receive a desired haptic effect waveform for the haptic effect, to receive sensor information that indicates at least one of speed, acceleration, and position of the haptic output device, and to generate a control signal for the haptic effect based on the desired haptic effect waveform and the at least one of the speed, acceleration, and position of the haptic output device, wherein the control signal causes a profile of the haptic effect to substantially match the desired haptic effect waveform, such that matching between the profile of the haptic effect and the desired haptic effect waveform is made more similar by basing the control signal on the at least one of the speed, acceleration, and position of the haptic output device.

19 Claims, 6 Drawing Sheets

(56) References Cited

U.S. PATENT DOCUMENTS

| | | |
|---|---|---|
| 9,558,637 B2 * | 1/2017 | Heubel .................. G06F 3/016 |
| 9,878,239 B2 * | 1/2018 | Heubel .................. G06F 3/016 |
| 2003/0103044 A1 | 6/2003 | Sunda et al. |
| 2004/0095369 A1 | 5/2004 | Takeuchi et al. |
| 2005/0007340 A1 | 1/2005 | Kobayashi et al. |
| 2006/0119573 A1 | 6/2006 | Grant et al. |
| 2007/0080929 A1 | 4/2007 | Hardwick |
| 2009/0106655 A1 | 4/2009 | Grant et al. |
| 2009/0128306 A1 | 5/2009 | Luden et al. |
| 2010/0283731 A1 | 11/2010 | Grant et al. |
| 2011/0115754 A1 | 5/2011 | Cruz-Hernandez |
| 2012/0028577 A1 | 2/2012 | Rodriguez et al. |
| 2013/0207917 A1 | 8/2013 | Cruz-Hernandez et al. |
| 2014/0117887 A1 | 5/2014 | Billington et al. |
| 2014/0139327 A1 | 5/2014 | Bau et al. |
| 2014/0198130 A1 * | 7/2014 | Lacroix .................. G06F 3/016 345/633 |
| 2014/0245139 A1 | 8/2014 | Lee et al. |
| 2015/0054773 A1 | 2/2015 | Jiang et al. |
| 2015/0123498 A1 | 5/2015 | Yang et al. |
| 2015/0123776 A1 | 5/2015 | Lee et al. |
| 2015/0338926 A1 | 11/2015 | Park et al. |
| 2016/0004308 A1 | 1/2016 | Cruz-Hernandez et al. |
| 2016/0259480 A1 | 9/2016 | Augenbergs et al. |
| 2016/0320842 A1 | 11/2016 | Saboune et al. |
| 2017/0038841 A1 | 2/2017 | Takeda et al. |

OTHER PUBLICATIONS

Communication Pursuant to Article 94(3) EPC dated Jun. 13, 2018 in corresponding European Patent Application No. 15 197 035.7.

* cited by examiner

DEVICE AND METHOD FOR CONTROLLING HAPTIC SIGNALS

CROSS-REFERENCE TO RELATED APPLICATIONS

This application is a continuation of U.S. patent application Ser. No. 14/950,797, filed Nov. 24, 2015 and issued as U.S. Pat. No. 9,846,484, which claims the benefit of U.S. Provisional Patent Application Ser. No. 62/087,752, filed Dec. 4, 2014, the entire contents of which are hereby incorporated by reference in their entirety.

FIELD OF THE INVENTION

Embodiments hereof relate in general to devices with haptic output devices and more particularly to systems and methods for controlling haptic output devices.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with user input elements to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed on devices to alert the user to specific events, or provide realistic feedback to the user regarding interaction of the medical device with the patient at the distal end of the medical device.

Figure 1:
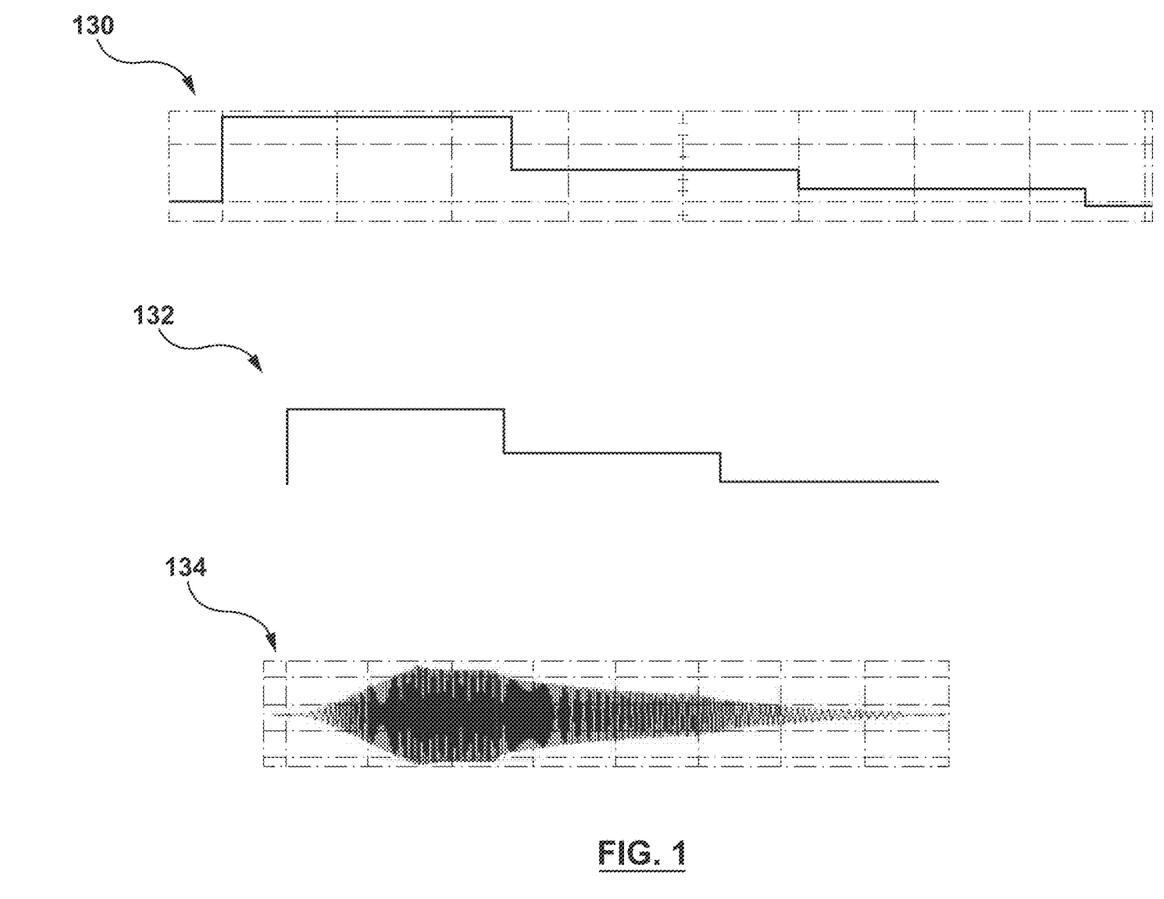
FIG. 1 is a schematic illustration of a desired haptic effect waveform, a control signal, and a haptic effect output in response to the control signal.

Conventional haptic feedback systems for gaming and other devices generally include one or more actuators attached to the housing for generating the haptic feedback. However, some actuators require a significant amount of time to slow down when braked and/or a significant amount of time to kick start. As such, a profile of the haptic effects output or delivered by the actuator may not match the desired haptic effect waveform. More particularly, as shown in FIG. 1, a desired haptic effect waveform 130 is shown with a corresponding or matching control signal 132. A haptic effect 134 output in response to control signal 132 is also shown. The profile of haptic effect 134 does not closely match or follow control signal 132 nor desired haptic effect waveform 130.

Embodiments hereof relate to methods and systems to improve an actuator's ability to achieve a desired haptic profile or waveform.

BRIEF SUMMARY OF THE INVENTION

Embodiments hereof are directed to a method of controlling a haptic output device. A first input including a desired haptic effect waveform is received. The desired haptic effect waveform includes at least one strength increase or strength decrease. A second input from a sensor is received. The second input includes a current operational status of the haptic output device. A control signal is generated via an algorithm that uses both the first and second inputs. The control signal is applied to the haptic output device to instruct the haptic output device to output a haptic effect having a profile. The control signal causes the profile of the haptic effect to include a strength increase or strength decrease that substantially matches the strength increase or strength decrease, respectively, of the desired haptic effect waveform.

Embodiments hereof are also directed to a system for controlling a haptic output device. In an embodiment, the system includes a processor, a haptic peripheral including a haptic output device, and a sensor coupled to the haptic output device. The haptic output device is configured to receive a control signal from the processor and output a haptic effect having a profile to the haptic peripheral in response to the control signal from the processor. The sensor is configured to sense a current operational status of the haptic output device. The processor is configured to generate the control signal for the haptic output device depending on a plurality of inputs including a desired haptic effect waveform, a signal received from the sensor, and at least one parameter of the haptic output device. As such, the control signal causes the profile of the haptic effect to substantially match the desired haptic effect waveform.

According to another embodiment hereof, the system includes a processor, a haptic peripheral including a haptic output device, and a sensor coupled to the haptic output device. The haptic output device is a brushless electric DC motor having internal controls to automatically kick start and brake the motor. The haptic output device is configured to receive a control signal from the processor and output a haptic effect having a profile to the haptic peripheral in response to the control signal from the processor. The sensor is configured to sense a position, a speed, or an acceleration to the haptic output device. The processor is configured to vary the control signal for the haptic output device depending on a desired haptic effect waveform that includes at least one strength increase or strength decrease and on a signal received from the sensor. As such, the control signal causes the profile of the haptic effect to include a strength increase or strength decrease that substantially matches the strength increase or strength decrease of the desired haptic effect waveform.

The haptic peripheral may be a game controller, tablet, phone, personal digital assistant (PDA), computer, gaming peripheral, mouse, wearable user items, or other devices which include haptic output devices for outputting haptic effects. The processor may be disposed in a host computer or in the haptic peripheral.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other devices having haptic output devices.

Figure 2A:
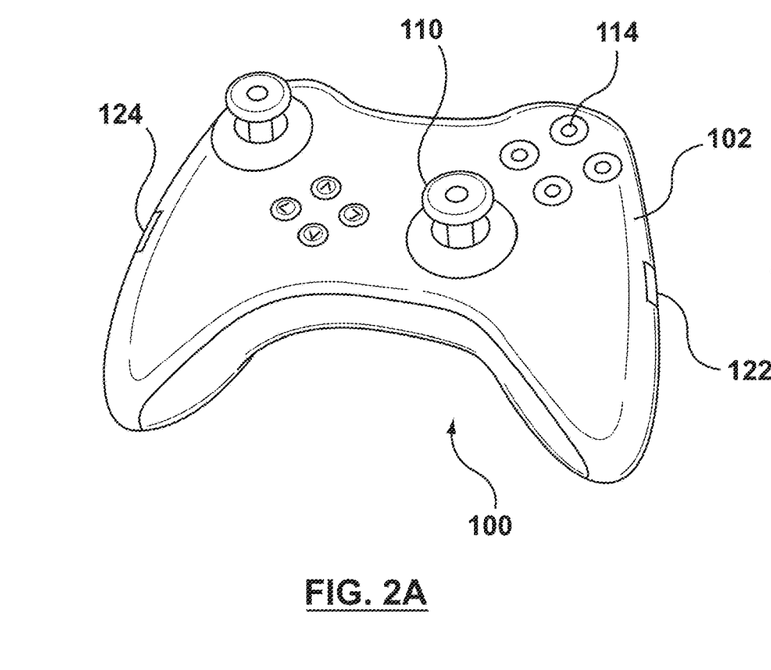
FIG. 2A is a schematic illustration of an embodiment of a haptic peripheral or controller.
Figure 2B:
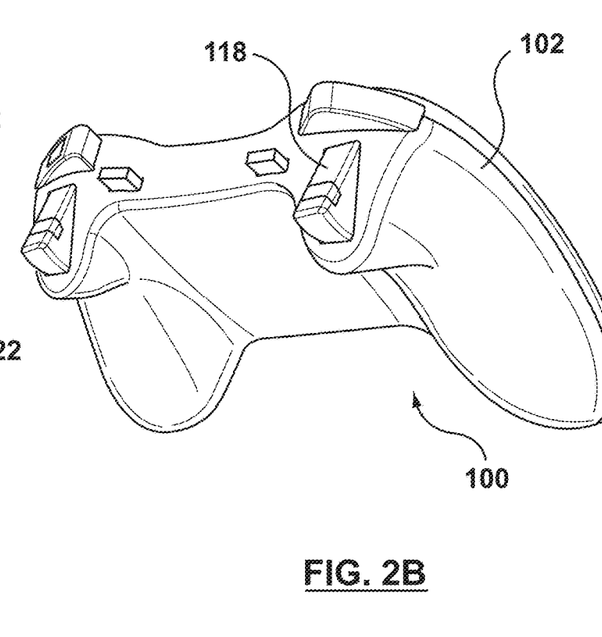
FIG. 2B is a schematic illustration of another view of the haptic peripheral or controller of FIG. 2A.

Embodiments hereof relate to systems and methods for controlling a haptic output device. The haptic output device is disposed within or on a haptic peripheral. The haptic peripheral may be, for example, a handheld gaming haptic peripheral 100 for a gaming system as shown in FIGS. 2A-2B or other devices that include haptic output devices for outputting haptic effects such as, but not limited to, phones, personal digital assistants (PDA), tablets, computers, gaming peripherals, computer mouse, wearable user items, medical devices, automotive controls, remote controls, touch screens, or the like.

Figure 3:
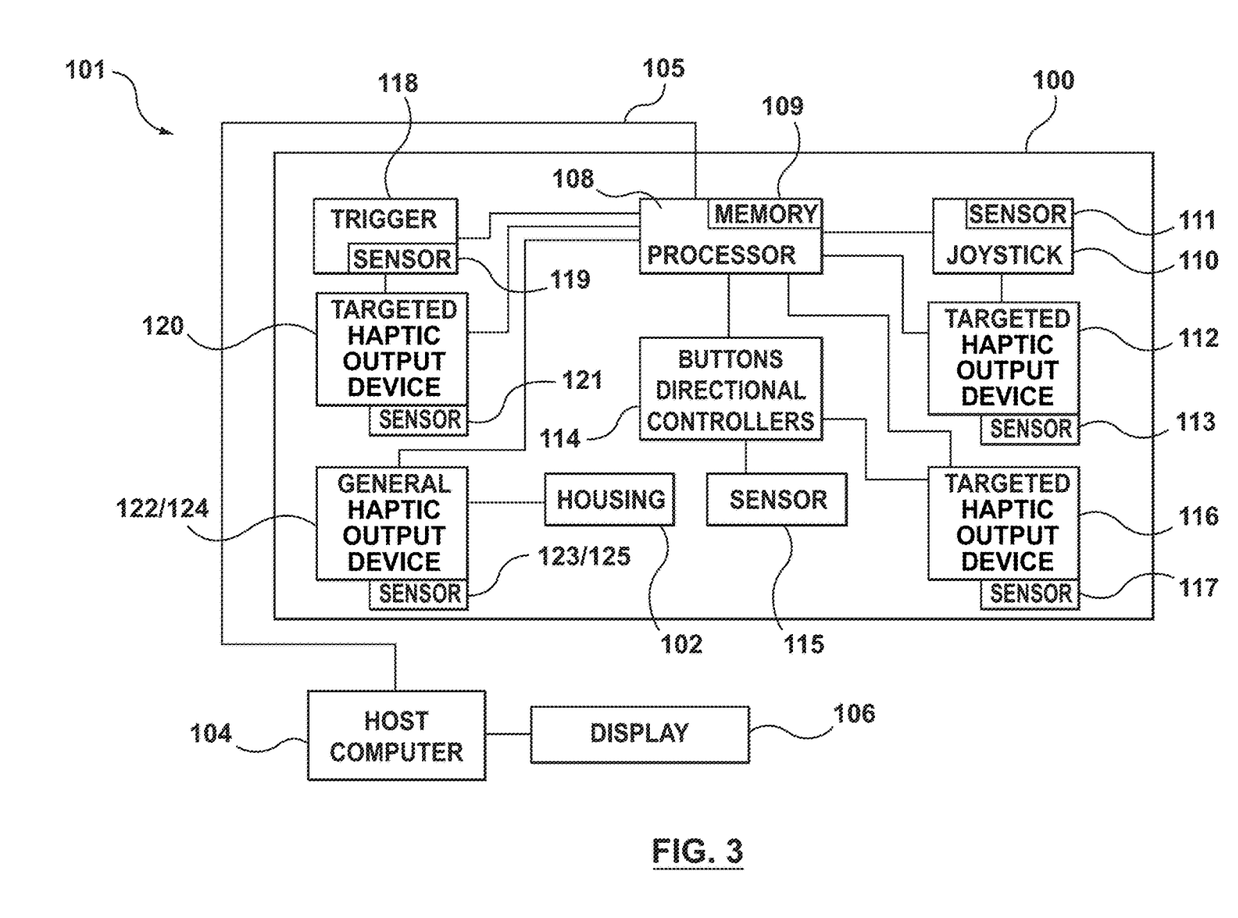
FIG. 3 is a block diagram of the haptic peripheral or controller of FIG. 2A in conjunction with a host computer and display.

Haptic peripheral 100 may be generally used with a gaming system that may be connected to a computer, mobile phone, television, or other similar device. FIGS. 2A-2B illustrate different perspective views of haptic peripheral 100, while FIG. 3 illustrates a block diagram of haptic peripheral 100 used in a gaming system 101 that further includes a host computer 104 and a display 106. As shown in the block diagram of FIG. 3, haptic peripheral 100 includes a local processor 108 which communicates with host computer 104 via a connection 105. Connection 105 may be a wired connection, a wireless connection, or other types of connections known to those skilled in the art. Local processor 108 may be any type of general purpose processor, or could be a processor specifically designed to provide haptic effects, such as an application-specific integrated circuit ("ASIC"). Haptic peripheral 100 may be alternatively configured to not include local processor 108, whereby all input/output signals from haptic peripheral 100 are handled and processed directly by a processor of host computer 104. Host computer 104 is coupled to display screen 106. In an embodiment, host computer 104 is a gaming device console and display screen 106 is a monitor which is coupled to the gaming device console, as known in the art. In another embodiment, as known to those skilled in the art, host computer 104 and display screen 106 may be combined into a single device.

A housing 102 of haptic peripheral 100 is shaped to easily accommodate two hands gripping the device, either by a left-handed user or a right-handed user. Those skilled in the art would recognize that haptic peripheral 100 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, as well as controllers shaped as real life objects (such as tennis rackets, golf clubs, baseball bats, and the like) and other shapes.

Haptic peripheral 100 includes several user input elements or manipulandums, including a joystick 110, a button 114, and a trigger 118. As used herein, user input element refers to an interface device such as a trigger, button, joystick, or the like, which is manipulated by the user to interact with host computer 104. As can be seen in FIGS. 2A-2B and known to those skilled in the art, more than one of each user input element and additional user input elements may be included on haptic peripheral 100. Accordingly, the present description of a trigger 118, for example, does not limit haptic peripheral 100 to a single trigger. Further, the block diagram of FIG. 3 shows only one (1) of each of joystick 110, button 114, and trigger 118. However, those skilled in the art would understand that multiple joysticks, buttons, and triggers, as well as other user input elements, may be used, as described above.

As can be seen in the block diagram of FIG. 3, haptic peripheral 100 includes a targeted haptic output device or motor for each of the user input elements thereof as well as one or more general or rumble haptic output devices 122, 124 coupled to housing 102 in a location where a hand of the user is generally located. More particularly, joystick 110 includes a haptic output device or motor 112 coupled thereto, button 114 includes a haptic output device or motor 116 coupled thereto, and trigger 118 includes a haptic output device or motor 120 coupled thereto. Each haptic output device 112, 116, 120 includes a sensor 113, 117, 121, respectively, coupled thereto for sensing a current operational status of respective haptic output device as will be described in more detail herein. In addition, haptic peripheral 100 includes a position sensor coupled to each of the user input elements thereof. More particularly, joystick 110 includes a position sensor 111 coupled thereto, button 114 includes a position sensor 115 coupled thereto, and trigger 118 includes a position sensor 119 coupled thereto. Local processor 108 is coupled to haptic output devices 112, 116, 120 as well as position sensors 111, 115, 119 of joystick 110, button 114, and trigger 118, respectively.

In response to signals received from position sensors 111, 115, 119, local processor 108 instructs haptic output devices 112, 116, 120 to provide haptic effects to joystick 110, button 114, and trigger 118, respectively. Such effects are discernible or distinguishable from general or rumble haptic effects produced by general haptic output devices 122, 124 along the entire body of the controller. Each general haptic output device 122, 124 includes a sensor 123, 125, respectively, coupled thereto for sensing a current operational status of its respective haptic output device as will be described in more detail herein. The collective haptic effects provide the user with a greater sense of immersion to the game as multiple modalities are being simultaneously engaged, e.g., video, audio, and haptics.

In determining the type of haptic effects to be executed and provided to the user, high level haptic parameters or streaming values are generated in the software code of the processor of host computer 104 and sent to processor 108 of haptic peripheral 100 where they are processed and the appropriate voltage levels are generated for the haptic output devices. This allows haptic peripheral 100 to provide the appropriate haptic feedback to the user for its haptic output devices and vary the amount or type of haptic feedback through the different voltage levels that are generated for the haptic output devices. This may be considered a local control embodiment in which host computer 104 provides high level supervisory commands to processor 108 of haptic peripheral 100, and processor 108 of haptic peripheral 100 decodes the commands and manages low level force control loops to sensors and the haptic output devices in accordance with the high level commands and independently of the host computer 104. More particularly, in operation, local processor 108 detects or receives positions and/or movement events from position sensors 111, 115, 119 and sends the positions and/or movement events to host computer 104. The processor of host computer 104 provides a control signal or high level supervisory or streaming commands to local processor 108, and local processor 108 then provides control signals to haptic output devices 112, 116, 120, 122, 124 based on the high level supervisory or streaming commands received from host computer 104. For example, when in operation, voltage magnitudes and durations of haptic effects are streamed from host computer 104 to haptic peripheral 100 where information is provided to haptic output devices 112, 116, 120, 122, 124 via local processor 108. Host computer 104 may provide high level commands to local processor 108 such as the type of haptic effect to be output (e.g. vibration, jolt, detent, pop, etc.) by haptic output devices 112, 116, 120, 122, 124 whereby the local processor 108 instructs haptic output devices 112, 116, 120, 122, 124 as to particular characteristics of the haptic effect which is to be output (e.g. magnitude, frequency, duration, etc.). Local processor 108 may retrieve the type, magnitude, frequency, duration, or other characteristics of the haptic effect from a memory 109 coupled thereto (shown in the block diagram of FIG. 3).

Although not shown on FIG. 3, a driver interface may optionally be connected between local processor 108 of haptic peripheral 100 and each haptic output device to convert signals from local processor 108 into signals appropriate to drive the respective haptic output device. The driver interface can include power amplifiers, switches, digital to analog controllers (DACs), analog to digital controllers (ADCs), and other components, as is well known to those skilled in the art. For example, voltage mode amplifiers are low cost components that can be used in the driver interface to drive the motors based on control signals from local processor 108 of haptic peripheral 100. Local processor 108 outputs control signals to the driver interface which includes electronic components and circuitry used to supply a haptic output device with the required electrical current and voltage to cause the desired haptic effects. Each haptic output device may include a separate drive circuit, all coupled to local processor 108.

In a different, host-controlled embodiment, host computer 104 can provide low-level force commands to haptic peripheral 100, which are directly transmitted to the haptic output devices via local processor 108 of haptic peripheral 100 or other circuitry (if no local processor 108 is present). The processor of host computer 104 thus directly controls and processes all signals to and from the haptic peripheral, e.g. the host computer directly controls the forces output by the haptic output devices of haptic peripheral 100. This embodiment may be desirable to reduce the cost of the force feedback device yet further, since no complex local processor 108 or other processing circuitry need be included in haptic peripheral 100.

In another embodiment, other hardware can be provided locally to haptic peripheral 100 to provide functionality similar to local processor 108. For example, a hardware state machine incorporating fixed logic can be used to provide signals to the haptic output devices and receive sensor signals from the sensors, and to output tactile signals according to a predefined sequence, algorithm, or process. Techniques for implementing logic with desired functions in hardware are well known to those skilled in the art. Such hardware can be well suited to less complex force feedback devices. In another embodiment, functionality similar to local processor 108 may be provided locally within the integrated circuitry of the driver interface or may be provided locally within the circuitry of the haptic output device. As such, as used herein, the term "processor" includes a separate or stand-alone component which performs the functions described herein as well as embodiments in which the functionality described herein is integrated into and executed by another component of haptic peripheral 100 such as but not limited to the driver interface or a haptic output device of haptic peripheral 100.

Embodiments hereof relate to methods and systems to improve a haptic output device's ability to achieve a desired haptic effect waveform. The method of controlling a haptic output device as described herein may be applied to one or more of haptic output devices 112, 116, 120, 122, 124 of haptic peripheral 100. Further, it is not required that haptic output devices 112, 116, 120, 122, 124 be the same type of haptic output device. The method of controlling a haptic output device as described herein may be applied to various types of haptic output devices. For example, although primarily described with respect to brushless electric DC motors, embodiments hereof may be applied to various haptic output devices including but not limited to brushed electric DC motors, electromagnetic motors, eccentric rotating mass ("ERM") actuators in which an eccentric mass is moved by a motor, linear resonant actuators ("LRAs") in which a mass attached to a spring is driven back and forth, a "smart material" such as piezoelectric, electro-active polymers that deform in response to signals or shape memory alloys, a solenoid resonant actuator ("SRA"), electromagnetic motors in which an eccentric mass is moved by a motor, vibrotactile actuators, inertial actuators, mechanisms for changing stiffness, electrostatic friction (ESF), ultrasonic surface friction (USF), devices that induce acoustic radiation pressure with an ultrasonic haptic transducer, devices that use a haptic substrate and a flexible or deformable surface, devices that provide projected haptic output such as a puff of air using an air jet, or any combination of actuators described above. In another embodiment, the haptic output device may use kinesthetic haptic feedback including, for example, solenoids to change the stiffness/damping of a user input element or the housing of haptic peripheral 100, small air bags that change size in a user input element or the housing of haptic peripheral 100, or shape changing materials.

The method described herein may be applied to various types of haptic output devices to provide a universal method of substantially matching or following a desired haptic effect waveform regardless of which type of haptic output device is utilized. As such, the algorithm described herein compensates for the differences between haptic output devices by using both current operational status information and property information about the haptic output device. More particularly, as explained above with respect to FIG. 1, some actuators or haptic output devices require a significant amount of time to slow down when braked and/or a significant amount of time to kick start. For example, a brushless electric DC motor has internal controls which allow the motor to automatically kick start and brake the motor. A brushless electric DC motor when in motion provides minimum friction and thus is a power efficient haptic output device that will not drain the power source of the system. A haptic peripheral having a brushless electric DC motor for a haptic output device thus has relatively lower power requirements, thereby reducing cost, volume, and power consumption. However, due to its minimum friction, the brushless electric DC motor takes a significant time to slow down when braked and a profile of the delivered haptic effects may not match or follow a desired haptic effect waveform. Embodiments hereof relate to generating a control signal to compensate for or take into account a current operational status and/or properties of the haptic output device to achieve the desired haptic effect waveform.

Figure 4:
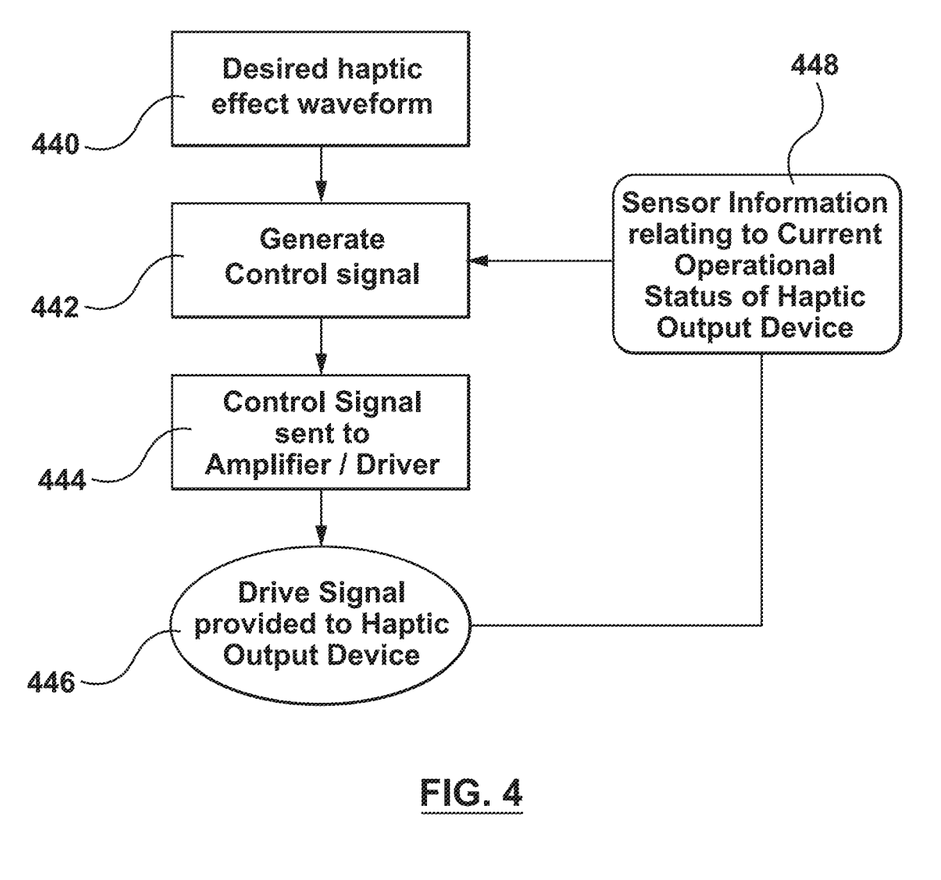
FIG. 4 is a flow chart illustrating a method for controlling haptic effects output by a haptic output device according to an embodiment hereof, wherein the method includes generating a control signal compensating for sensor information relating to a current operational status of the haptic output device.
Figure 5:
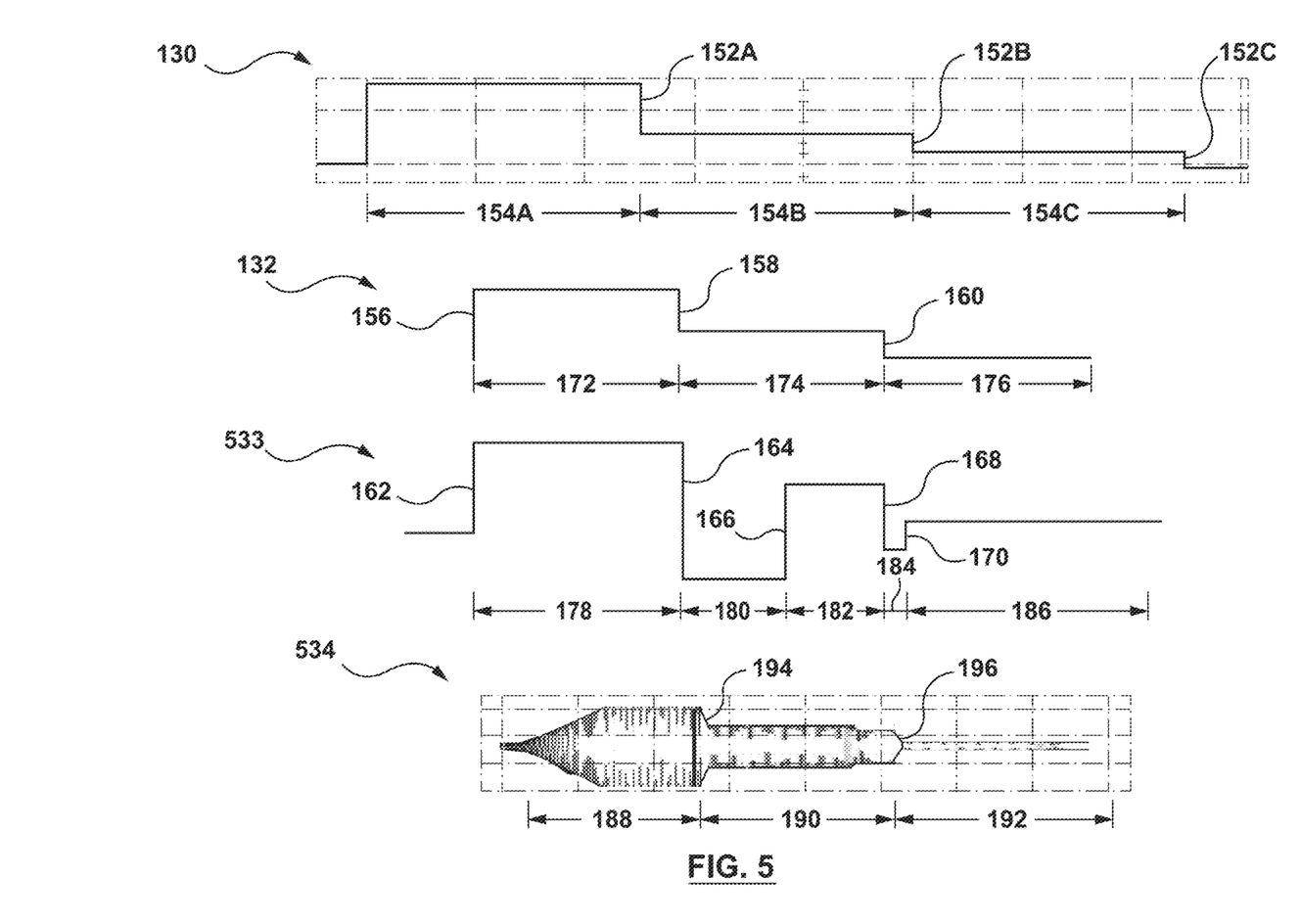
FIG. 5 is a schematic illustration of a desired haptic effect waveform, a first control signal prior to modification thereof, a second control signal after modification thereof according to the flow chart of FIG. 4, and a haptic effect output in response to the second or modified control signal.

Turning to FIGS. 4-5, a method for changing or updating the control signal to compensate for or take into account a current operational status of the haptic output device is illustrated. FIG. 4 is a flow chart illustrating a method for controlling haptic effects output by a haptic output device according to an embodiment hereof, wherein the method includes updating or modifying a control signal with sensor information relating to speed, motion, acceleration, or position of the haptic output device. FIG. 5 is a schematic illustration of a desired haptic effect waveform 130, a first control signal 132 prior to modification thereof, a second control signal 533 after modification thereof according to the flow chart of FIG. 4, and a haptic effect 534 output in response to the second or modified control signal. For sake of illustration, the flow diagram will be described with reference to host computer 104 and haptic peripheral 100. In an embodiment, the functionality of the flow diagram of FIG. 4 is implemented by software stored in the memory of host computer 104 and executed by the processor of host computer 104, and/or memory 109 of haptic peripheral 100 and executed by local processor 108 of haptic peripheral 100. In other embodiments, the functionality may be performed by hardware through the use of an application specific integrated circuit ("ASIC"), a programmable gate array ("PGA"), a field programmable gate array ("FPGA"), or any combination of hardware and software. As previously described herein, the processor of host computer 104 and/or processor 108 of haptic peripheral 100 may be a separate or stand-alone component which performs the functions described herein or the functionality described herein with respect to the processor of host computer 104 and/or processor 108 of haptic peripheral 100 may be integrated into and executed by another component of haptic peripheral 100 such as but not limited to the driver interface or a haptic output device of haptic peripheral 100.

As an initial step prior to the flow chart illustrated on FIG. 4, desired haptic effect waveform 130 (shown on FIG. 1 and FIG. 5) is determined or set. Desired haptic effect waveform 130 is the user intended haptic experience. As shown in FIG. 5, in an embodiment hereof, desired haptic effect waveform 130 includes a strength increase 150 as well as a plurality of strength decreases 152A, 152B, 152C. Via strength decreases 152A, 152B, 152C, desired haptic effect waveform 130 conveys a plurality of different magnitudes or amplitudes that are to be applied as haptic effects for a plurality of consecutive time periods or durations 154A, 154B, 154C. During durations 154A, 154B, 154C, the strength of the previously applied haptic effect (i.e., the previously applied strength increase or strength decrease) is sustained. As used herein, a strength increase refers to an increase in magnitude or amplitude of a desired haptic effect waveform, or to the corresponding increase in magnitude or amplitude of the haptic effect output in response to a control signal. Similarly, a strength decrease refers to a decrease in magnitude or amplitude of a desired haptic effect waveform, or to the corresponding decrease in magnitude or amplitude of the haptic effect output in response to a control signal. Desired haptic effect waveform 130 may be determined or set by a user or by a programmer or creator of the haptic effects.

In the embodiment of FIG. 5, desired haptic effect waveform 130 includes strength increase 150 as well as a plurality of strength decreases 152A, 152B, 152C as described above. However, as will be understood by one of ordinary skill in the art, the desired haptic effect waveform is not required to be the shape shown in FIG. 5. The desired haptic effect waveform may be any type of waveform including but not limited to a sine or sinusoidal periodic wave, a square wave, a pulse wave, a triangular wave, or a nonperiodic wave. Waveforms may be utilized to output a vibration effect at a particular frequency (period) and magnitude or amplitude. Single, non-directional jolts can be output as a single period of a vibration or part of a period of a vibration. When provided or supplied to the processor of host computer 104 and/or processor 108 of haptic peripheral 100, the desired haptic effect waveform typically includes a frequency command, a magnitude command, and a waveform or function as parameters or inputs to the processor. Generation of control signals based on desired haptic effect waveforms are further described in U.S. Pat. No. 7,446,752 to Goldenberg et al., assigned by the same assignee as the present application, hereby incorporated by reference in its entirety. In addition to periodic vibrational effects, nonperiodic effects and/or consistent force effects may also be played or output on the haptic output devices of haptic peripheral 100 as described in U.S. Pat. No. 7,446,752 to Goldenberg et al.

As will be understood by one of ordinary skill in the art, desired haptic effect waveform 130 is translated into digital data that is sent or otherwise provided to the processor of host computer 104 and/or processor 108 of haptic peripheral 100. Desired haptic effect waveform 130 is thus a first input provided to the processor of host computer 104 and/or processor 108 of haptic peripheral 100 as shown at step 440 of FIG. 4. Desired haptic effect waveform 130 may be sent or otherwise provided to the processor of host computer 104 and/or processor 108 of haptic peripheral 100 in digital form over an interface such as I2c/SPI or other similar interface, or may sent or otherwise provided to the processor of host computer 104 and/or processor 108 of haptic peripheral 100 in signal form such as a PWM (pulse width modulation) signal with duty cycle/frequency control or analog signal with magnitude and/or timing control.

In addition to desired haptic effect waveform 130, current operational status information of the haptic output device is also provided to the processor of host computer 104 and/or processor 108 of haptic peripheral 100 as a second input as shown at step 448 of FIG. 4. More particularly, each haptic output device 112, 116, 120, 122, 124 includes respective sensor 113, 117, 121, 123, 125, respectively, coupled thereto for sensing a current operational status of the respective haptic output device. In an embodiment hereof, sensors 113, 117, 121, 123, 125 are configured to sense a position, a speed, acceleration, or a motion of the respective haptic output device. For example, the sensor is configured to detect whether a particular haptic output device is at a standstill, in motion, and/or the speed thereof. In an embodiment, sensors 113, 117, 121, 123, 125 are hall-effect sensors but may be other types of speed, motion, acceleration, or position sensors known in the art such as but not limited to accelerometers, potentiometers, magnetic field sensors, optical encoders, capacitive sensors, back emf sensors, and the like.

At step 442 of FIG. 4, a control signal is generated via an algorithm or internal logic executed by the processor of host computer 104 and/or processor 108 of haptic peripheral 100. As shown on FIG. 4, the algorithm uses desired haptic effect waveform 130 as a first input (step 440) and current operational status information of the haptic output device from its respective sensor as a second input (step 448). In an embodiment, the control signal originates from the first and second inputs such that the algorithm or internal logic initially creates the control signal according to the first and second inputs. In another embodiment, the control signal is updated or changed due to the first and second inputs. More particularly, a base control signal may be stored within host computer 104 and/or haptic peripheral 100 and the algorithm or internal logic may update, modify, vary, or otherwise change the base control signal according to the first and second inputs. As used herein, the term "generates" includes a control signal that originates from the algorithm as well as a control signal that is updated, modified, varied, or otherwise changed by the algorithm. The update rate depends on the characteristics of the sensor as well as the haptic output device. In an embodiment, the control signal may be modified or updated in real time as the current operational status of the haptic output device changes as detected via sensors 113, 117, 121, 123, 125.

The control signal generated at step 442 of FIG. 4 is configured to control the haptic output device to output or deliver a haptic effect having a profile that closely matches or follows desired haptic effect waveform 130. More particularly, the control signal generated at step 442 of FIG. 4 is sent to the driver interface or amplifier of haptic peripheral 100 at step 444 of FIG. 4, and a drive signal is provided to the haptic output device at step 446 of FIG. 4 to instruct the haptic output device to output a haptic effect in response to the control signal generated at step 442. Thus, the control signal generated at step 442 is applied to the haptic output device as a drive signal that instructs the haptic output device to output a haptic effect having a profile, and the profile of the haptic effect closely matches or follows desired haptic effect waveform 130.

More particularly, with reference to FIG. 5, first control signal 132 is shown with a profile that closely matches or follows desired haptic effect waveform 130. However, as described with respect to FIG. 1, when first control signal 132 is applied to certain haptic output devices, the profile of the output haptic effect does not match or follow neither first control signal 132 nor desired haptic effect waveform 130. In an embodiment hereof, first control signal 132 may be a base control signal that is stored in host computer 104 and/or haptic peripheral 100. Second control signal 533 of FIG. 5 is an example of how first control signal 132 may be modified according to the flow chart of FIG. 4. With current operational status information of the haptic output device from its respective sensor being received as an input, the algorithm executed by processor of host computer 104 and/or processor 108 of haptic peripheral 100 modifies or changes first control signal 132 into second control signal 533 to compensate for or take into account the current operational status of the haptic output device. When applied to the haptic output device, second control signal 533 results in haptic effect 534 which closely or substantially matches or follows desired haptic effect waveform 130.

In the embodiment of FIG. 5, second control signal 533 causes the profile of haptic effect 534 to include a strength increase or strength decrease that substantially matches or follows the strength increase or strength decrease of desired haptic effect waveform 130. More particularly, a first strength decrease 194 of haptic effect 534 is shown to substantially match or follow first strength decrease 152A of desired haptic effect waveform 130 and a second strength decrease 196 of haptic effect 534 is shown to substantially match or follow second strength decrease 152B of desired haptic effect waveform 130. Durations 154A, 154B, 154C of desired haptic effect waveform 130 correspond to durations 188, 190, 192, respectively, of haptic effect 534 in which the strength of the output or delivered haptic effect is sustained.

It is desirable for the profile of the haptic effect to substantially match the desired haptic effect waveform in terms of amplitude and timing. As used herein, "substantially match" or "closely match" means that the profile of the haptic effect more closely follows the amplitude and timing of the desired haptic effect waveform when the control signal utilizes the current operational status of the haptic output device as an input relative to when the control signal does not utilize the current operational status of the haptic output device as an input. Stated another way, when the current operational status of the haptic output device is taken into account, matching between the profile of the haptic effect and the desired haptic effect waveform is improved. In an embodiment hereof, the profile of the haptic effect has the same amplitude, within a margin of error equal to or less than 25%, as the desired haptic effect waveform and changes in amplitude of the profile of the haptic effect occur at the same time, within a margin of error equal to or less than 25%, as changes in amplitude of the desired haptic effect waveform.

Notably, second control signal 533 as modified according to the flow chart of FIG. 4 is a different signal or waveform that has a different profile/shape than first control signal 132 and desired haptic effect waveform 130. More particularly, with reference to FIG. 5, first control signal 132 includes a kick 156 which includes an increase in magnitude or amplitude of a haptic effect, a first duration or time period 172 with no amplitude or magnitude changes of the haptic effect such that the haptic effect is sustained at the previous strength, a first brake 158 which includes a decrease in magnitude or amplitude of the haptic effect, a second duration or time period 174 with no amplitude or magnitude changes of the haptic effect such that the haptic effect is sustained at the previous strength, a second brake 160 which includes a decrease in magnitude or amplitude of the haptic effect, and a third duration or time period 176 with no amplitude or magnitude changes of the haptic effect such that the haptic effect is sustained at the previous strength. Conversely, second control signal 533 includes a first kick 533 which includes an increase in magnitude or amplitude of a haptic effect, a first duration or time period 178 with no amplitude or magnitude changes of the haptic effect such that the haptic effect is sustained at the previous strength, a first brake 164 which includes a decrease in magnitude or amplitude of the haptic effect, a second duration or time period 180 with no amplitude or magnitude changes of the haptic effect such that the haptic effect is sustained at the previous strength, a second kick 166 which includes an increase in magnitude or amplitude of a haptic effect, a third duration or time period 182 with no amplitude or magnitude changes of the haptic effect such that the haptic effect is sustained at the previous strength, a second brake 168 which includes a decrease in magnitude or amplitude of the haptic effect, a fourth duration or time period 184 with no amplitude or magnitude changes of the haptic effect such that the haptic effect is sustained at the previous strength, a third kick 170 which includes an increase in magnitude or amplitude of a haptic effect, and a fifth duration or time period 184 with no amplitude or magnitude changes of the haptic effect such that the haptic effect is sustained at the previous strength.

To illustrate the differences between first and second control signals 132, 533, respectively, second duration 174 of first control signal 132 is compared to second and third durations 180, 182 of second control signal 533. Second duration 174 of first control signal 132 is equal to second and third durations 180, 182 of second control signal 533. Second duration 174 of first control signal 132 and second and third durations 180, 182 of second control signal 533 each correspond to second duration 154B of desired haptic effect waveform 130, as well as to second duration 190 of haptic effect 534. During second duration 154B of desired haptic effect waveform 130, only first strength decrease 152A occurs which is relatively small in magnitude or amplitude. Similarly, during second duration 190 of haptic effect 534 only a first strength decrease 194 occurs which is relatively small in magnitude or amplitude, and during second duration 174 of first control signal 132 only first brake 158 occurs which is relatively small in magnitude or amplitude. In contrast, during second and third durations 180, 182 of second control signal 533, first brake 164, second kick 166, and second brake 168 occur, each of which are relatively higher in magnitude or amplitude than first brake 158 of first control signal 132. When being applied to a haptic output device such as a brushless electric DC motor with minimal friction, second control signal 533 applies a very large brake (first brake 164), followed by a kick (second kick 166) and another brake (second brake 168) in order to achieve the profile or waveform corresponding to second duration 154B of desired haptic effect profile 130 and second duration 190 of haptic effect 534. Stated another way, second control signal 533 includes a plurality of kicks and brakes (first brake 164, second kick 166, second brake 168) in order to cause the profile of haptic effect 534 to include only a single strength decrease (first strength decrease 194) that substantially matches the single strength decrease (first strength decrease 152A) of desired haptic effect waveform 130.

In practice, instantaneous strength increases or decreases (corresponding to kicks and brakes of a control signal) cannot be achieved because of physical limitations of the system that generates the waveform. When outputting a kick of a control signal, the time taken for a haptic output device to rise from the low level to the high level is called the rise time, and when outputting a brake of a control signal, the time taken for a haptic output device to fall from the high level to the low level is called the fall time. As such, the output strength increases and strength decreases of haptic effect 534 are not instantaneous but rather necessarily include rise and fall times, respectively. It is an object of the present invention to minimize the rise times and fall times for the output strength increases and strength decreases such that the profile of haptic effect 534 will substantially match or follow the strength increase or strength decrease of desired haptic effect waveform 130. Stated another way, in an embodiment in which the desired haptic effect waveform includes instantaneous strength increases and/or strength decreases, the corresponding strength increases and/or strength decreases of the output or delivered haptic effect have minimized or decreased rise and fall times, respectively, when the control signal utilizes the current operational status of the haptic output device as an input relative to when the control signal does not utilize the current operational status of the haptic output device as an input.

Figure 6:
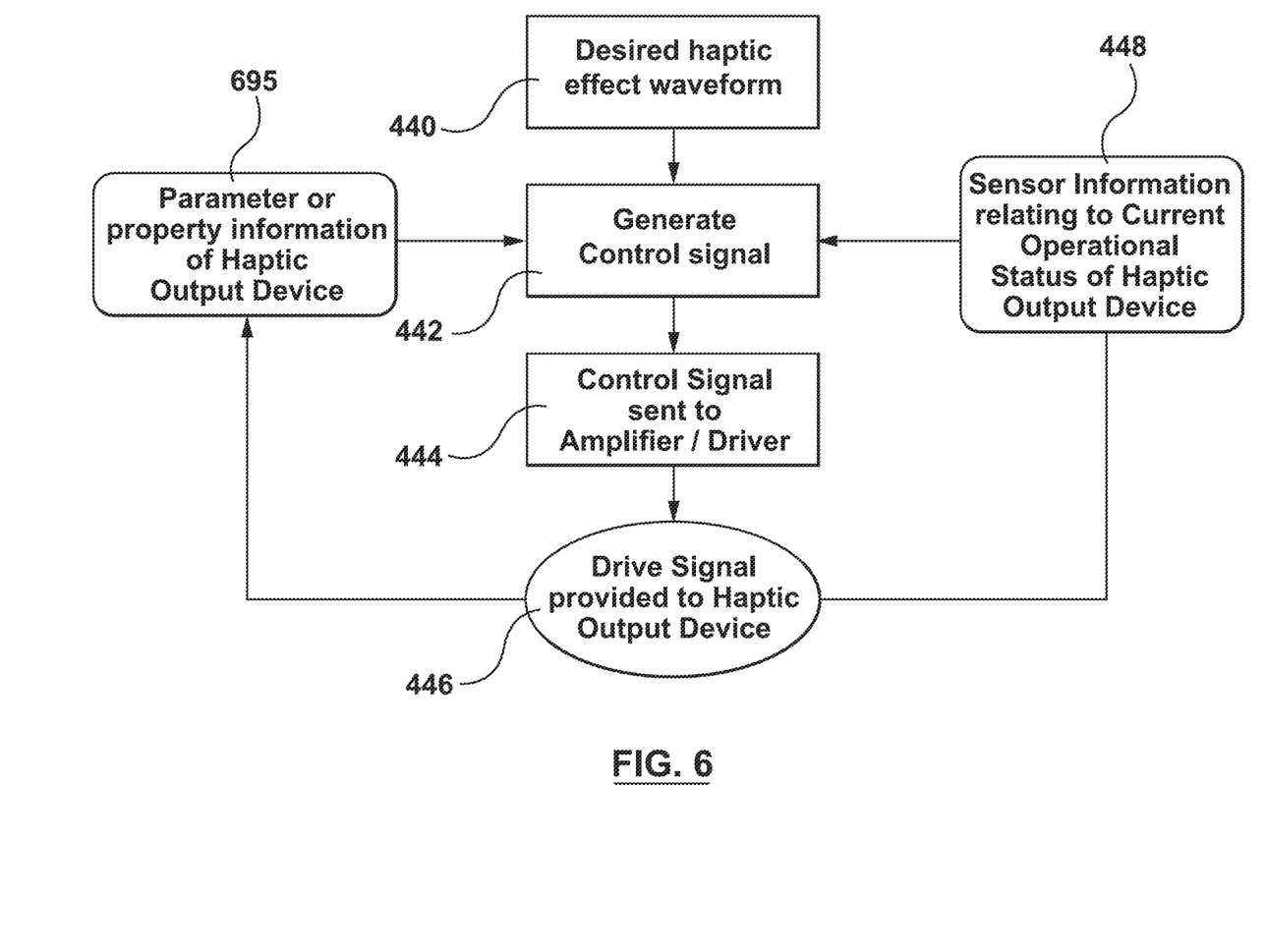
FIG. 6 is a flow chart illustrating a method for controlling haptic effects output by a haptic output device according to another embodiment hereof, wherein the method includes generating a control signal compensating for sensor information relating to a current operational status of the haptic output device as well as parameters or properties of the haptic output device.

In another embodiment hereof shown in FIG. 6, parameters or properties of the haptic output device may also be used as a third input for generating or updating the control signal as shown at step 695 of FIG. 6 in addition to desired haptic effect waveform 130 as a first input (step 440) and current operational status information of the haptic output device from its respective sensor as a second input (step 448). Parameters or properties of the haptic output device may include identification of the type of haptic output device, a characteristic of the haptic output device, and/or a past user experience relating to the haptic output device. In an embodiment, parameters or properties of the haptic output device are provided to the processor of host computer 104 and/or processor 108 of haptic peripheral 100 from the haptic output device itself. For example, the processor of host computer 104 and/or processor 108 of haptic peripheral 100 may be configured to read or extract such information from the haptic output device. In another embodiment, parameters or properties of the haptic output device are provided to the processor of host computer 104 and/or processor 108 of haptic peripheral 100 from the user. For example, a user may input information relating to their previous experience or analysis of how the haptic output device outputs haptic effects.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A non-transitory computer-readable medium for generating a haptic effect, the computer-readable-medium having computer-executable code that, when executed by a processor, causes the processor
to receive a desired haptic effect waveform for the haptic effect,
to receive sensor information from a sensor in communication with the processor, wherein the sensor is configured to sense at least one of a speed, an acceleration, and a position of a haptic output device, and wherein the sensor information indicates the at least one of the speed, the acceleration, and the position of the haptic output device,
to generate a control signal for the haptic effect based on the desired haptic effect waveform and based on the at least one of the speed, the acceleration, and the position of the haptic output device, wherein the control signal causes a profile of the haptic effect to substantially match the desired haptic effect waveform, such that matching between the profile of the haptic effect and the desired haptic effect waveform is made more similar by basing the control signal on the at least one of the speed, the acceleration, and the position of the haptic output device, and
to communicate the control signal to the haptic output device, wherein the haptic output device is configured to output the haptic effect based on the control signal from the processor.

2. The non-transitory computer-readable medium of claim 1, wherein the haptic output device, the sensor, and the processor are part of a haptic peripheral.

3. The non-transitory computer-readable medium of claim 1, wherein the haptic output device is part of a haptic peripheral, and wherein the processor is part of a host computer in communication with the haptic peripheral.

4. The non-transitory computer-readable medium of claim 1, wherein the haptic output device is a brushless electric DC motor.

5. The non-transitory computer-readable medium of claim 4, wherein the control signal is further based on a characteristic of the haptic output device.

6. The non-transitory computer-readable medium of claim 5, wherein the characteristic on which the control signal is based is a device type of the haptic output device.

7. The non-transitory computer-readable medium of claim 6, wherein the control signal is further based on a past user experience relating to the haptic output device.

8. The non-transitory computer-readable medium of claim 1, wherein the desired haptic effect waveform includes at least one of a strength increase and a strength decrease, and wherein the control signal causes the profile of the haptic effect to include a strength increase or a strength decrease that substantially matches the strength increase or the strength decrease, respectively, of the desired haptic effect waveform.

9. The non-transitory computer-readable medium of claim 8, wherein the strength increase or the strength decrease of the profile of the haptic effect has the same amplitude as that of the strength increase or the strength decrease, respectively, of the desired haptic effect waveform, and wherein the strength increase or the strength decrease of the profile of the haptic effect occurs at the same time as the strength increase or the strength decrease, respectively, of the desired haptic effect waveform.

10. The non-transitory computer-readable medium of claim 9, wherein the control signal includes a plurality of kicks and brakes in order to cause the profile of the haptic effect to include the strength increase or the strength decrease that substantially matches the strength increase or the strength decrease of the desired haptic effect waveform.

11. A non-transitory computer-readable medium for generating a haptic effect, the computer-readable medium having computer-executable code that, when executed by a processor, causes the processor
to receive a desired haptic effect waveform for the haptic effect,
to determine a parameter that identifies a device type of a haptic output device,
to generate a control signal for the haptic effect based on the device type of the haptic output device, wherein the device type of the haptic output device is a first device type having an electric motor, a second device type having a linear resonant actuator (LRA) that includes a mass attached to a spring, a third device type having a piezoelectric actuator, a fourth device type having an electro-active polymer (EAP) actuator, a fifth device type having a shape memory alloy (SMA) actuator, or a sixth device type having a solenoid resonant actuator (SRA), such that the control signal is based on whether the haptic output device has the first device type, the second device type, the third device type, the fourth device type, the fifth device type, or the sixth device type, and
to provide the control signal to the haptic output device, wherein the control signal causes a profile of the haptic effect to substantially match the desired haptic effect waveform, and wherein the haptic output device is configured to output the haptic effect based on the control signal from the processor.

12. The non-transitory computer-readable medium of claim 11, wherein the computer-executable code is configured to further cause the processor to base the control signal on a past user experience relating to the haptic output device.

13. The non-transitory computer-readable medium of claim 11, further comprising a sensor coupled to the haptic output device and configured to sense a current operational status of the haptic output device, wherein the computer-executable code is configured to further cause the processor to base the control signal on the current operational status of the haptic output device.

14. The non-transitory computer-readable medium of claim 13, wherein the current operational status is a speed or an acceleration of the haptic output device.

15. The non-transitory computer-readable medium of claim 11, wherein the desired haptic effect waveform includes at least one of a strength increase and a strength decrease, and wherein the control signal causes the profile of the haptic effect to include a strength increase or a strength decrease with an amplitude and timing that substantially matches an amplitude and timing of the strength increase or the strength decrease, respectively, of the desired haptic effect waveform.

16. The non-transitory computer-readable medium of claim 11, wherein the control signal includes a plurality of kicks and brakes in order to cause the profile of the haptic effect to include a strength increase and a strength decrease that substantially matches a strength increase and a strength decrease, respectively, of the desired haptic effect waveform.

17. A non-transitory computer-readable medium for generating a haptic effect, the computer-readable medium having computer-executable code that, when executed by a processor, causes the processor to receive a desired haptic effect waveform for the haptic effect, to receive sensor information from a sensor coupled to a haptic output device, wherein the sensor is configured to sense a current operational status of the haptic output device, and the sensor information indicates the current operational status of the haptic output device, to generate a first control signal that substantially matches the desired haptic effect waveform, to modify the first control signal based on the current operational status of the haptic output device to generate a second control signal, wherein the second control signal has a different profile than the first control signal and a different profile than the desired haptic effect waveform, wherein the second control signal causes a profile of the haptic effect to substantially match the desired haptic effect waveform, such that matching between the profile of the haptic effect and the desired haptic effect waveform is made more similar by basing the second control signal on the current operational status of the haptic output device, and to provide the second control signal to the haptic output device, wherein the haptic output device is configured to generate the haptic effect based on the second control signal.

18. The non-transitory computer-readable medium of claim 17, wherein the second control signal causes the haptic effect to have multiple strength increases or multiple strength decreases that match multiple strength increases or multiple strength decreases, respectively, of the desired haptic effect waveform in terms of at least amplitude or timing, and wherein the current operational status of the haptic output device is at least one of a speed, an acceleration, and a position of the haptic output device.

19. The non-transitory computer-readable medium of claim 18, wherein the first control signal has a first strength increase or a first strength decrease at a first time, wherein the second control signal includes a second strength increase or a second strength decrease at the first time, the second strength increase or the second strength decrease having a greater amplitude than that of the first strength increase or the first strength decrease, and wherein the second control signal further includes a third strength increase or a third strength decrease at a second time, wherein, at the second time, no strength increase or strength decrease is in the first control signal.

* * * * *